United States Patent Office 3,169,046
Patented Feb. 9, 1965

3,169,046
METHOD OF WORKING-UP A SULFURIC-ACID MOTHER LIQUOR OBTAINED IN THE PRODUCTION OF TITANIUM DIOXIDE BY HYDROLYSIS
Walter Nespital, Leverkusen, Germany, assignor to Titangesellschaft mbH, Leverkusen, Germany, a corporation of Germany
No Drawing. Filed May 8, 1962, Ser. No. 193,327
Claims priority, application Germany, May 12, 1961,
T 20,150
5 Claims. (Cl. 23—202)

In the production of titanium dioxide by hydrolysis of solutions obtained by digestion of titaniferous material with concentrated sulfuric acid, there is obtained a mother liquor which, in addition to free sulfuric acid, contains iron sulfate, titanium sulfate, magnesium sulfate, vanadium sulfate and other sulfates.

This invention relates to an improved method for treating the so called mother liquor so as to recover the sulfuric acid and various other components such as iron and titanium as useful products.

Various proposals have already been suggested for the working-up of this mother liquor in order to separate the sulfuric acid, the titanium, iron and possibly other metal salts from each other, and recover them in useful form. For example, the mother liquor is concentrated to a higher sulfuric acid concentration (at least 60 to 65% $H_2SO_4$). In this connection, the greater part of the salts contained in the mother liquor precipitates and can be removed by filtration or the like. The filtrate is thereupon highly concentrated and used again for the digestion of the titaniferous material.

In the further processing of the salt mixture which has been removed, the suggested methods then differ. In one instance, the salt mixture is formed into a suspension with a small amount of water, in which connection it hydrates with heating and dissolves, whereupon iron sulfate-heptahydrate crystallizes out upon cooling. The filtrate is then returned to the production cycle of the $TiO_2$ manufacture (for instance for the dissolving of the digestion mass). It is a disadvantage in this method that the metal salts contained in the filtrate of the iron sulfate separation are also returned back into the digestion solution, whereby the danger of enrichment of impurities in the titanium dioxide upon hydrolysis exists. Another proposal has been to dissolve the salt mixture in the original mother liquor for the titanium hydrolysis. Cooling then is effected to separate iron sulfate heptahydrate, whereupon the latter is filtered off and the filtrate then concentrated after it has become enriched in titanium sulfate and other non-ferrous sulfates. At the same time, a certain amount of solution is removed and hydrolyzed for the recovery of $TiO_2$. The disadvantage of this method is that one obtains a strongly acid solution of only low titanium content, which is unfavorable for the hydrolysis. According to still another proposal, the salt mixture is dissolved in a given amount of water in the hot, whereupon the titanium is removed therefrom by hydrolysis and the filtrate concentrated to separate titanium-free iron sulfate-monohydrate. This method also operates unsatisfactorily since in order to dissolve the salt mixture, water is added which must be removed later on again by evaporation. There thus results a starting solution which is unfavorable for the separation of titanium by hydrolysis, since the titanium concentration is low and the hydrolysis therefore only incomplete. Iron sulfate monohydrate is obtained which, while it is free of titanium, contains all other impurities which must be removed as for example by roasting.

An object of the present invention is to effect the working-up of the sulfuric acid mother liquor obtained in the production of titanium dioxide by hydrolysis, with separate recovery of highly concentrated sulfuric acid, ironsulfate heptahydrate, titanium dioxide and possibly other metal compounds by concentration of the solution to about 60 to 65% sulfuric acid, and in this connection, to effect the further processing of the separated salt mixture which is crystallized out in such a manner that there is produced a hydrolysis solution which is favorable for the recovery of the titanium and which, while having a relatively high concentration of titanium sulfate, has a comparatively low concentration of sulfuric acid. It has now been found that this goal is reached if the resultant salt mixture which is as free as possible of acid is dissolved at elevated temperature in a weakly sulfuric acid iron-poor titanium sulfate solution and thereupon cooled, the iron sulfate-heptahydrate crystals which precipitate out being separated and the filtrate being used in part for the dissolving of new salt mixture and in part hydrolyzed and worked up into titanium dioxide.

In accordance with the method of the invention, the metals present as sulfates are separated from each other, and in this connection the iron, titanium and possibly vanadium are recovered in usable form. The iron sulfate is separated out in practically acid-free form as $$FeSO_4 \cdot 7H_2O$$

The heptahydrate obtained is very pure and is obtained in high yield, as compared with the volume employed. The titanium is obtained as hydrated oxide by hydrolysis. By the reuse of the filtrate of the iron sulfate separation for the dissolving of the salt mixture, there is obtained a high titanium sulfate concentration with a comparatively low sulfuric acid concentration. In this way, there can be obtained a yield of $TiO_2$ of good pigment quality, such as is not achieved by any other known method.

By the working-up of the mother liquor obtained upon the hydrolysis of this solution, the other components of the salt mixture, such as vanadium, manganese, etc., can also be recovered.

The 60 to 65% sulfuric acid remaining after separation of the salt mixture can be concentrated further in customary manner and used again for the digestion.

In detail, one proceeds as follows in accordance with the method claimed.

The mother liquor obtained upon the production of titanium dioxide by hydrolysis of the sulfuric acid solution is concentrated to about 65% sulfuric acid content and cooled. The salts which are obtained in the mother liquor and are precipitated such as iron sulfate, titanium sulfate, magnesium sulfate, etc., are removed by filtration, centrifuging or similar processes. For the carrying out of the method of the invention, it is particularly favorable for the salt mixture to be obtained in a form which is as far as possible free of acid. Therefore, upon the concentration and cooling of the mother liquor, one must keep this goal in mind, for instance by the addition of crystal seeds, by selection of the time of stay, and by selection of the acid feed, etc. In connection with the separation of the salt mixture, washing with a small amount of water, with dilute, possibly iron-containing sulfuric acid in the cold or hot, or else with organic solvents may be advisable. The ratio of $H_2SO_4$ to $TiO_2$ in the separated salt mixture should be as low as possible.

One should not, as far as possible, go above a value of 4:1. The salt mixture is dissolved in a dilute titanium sulfate solution at a temperature of about 50 to 80° C. It is desirable to employ, particularly for the starting of the process, a titanium sulfate solution having an $H_2SO_4:TiO_2$ ratio of 1.6:1 to 2:1, as is present approximately in the production of titanium dioxide. The solution of the salt mixture, after it has been filtered is cooled, preferably to 20° C. or lower. In this connection, iron sulfate heptahydrate precipitates out and is separated by filtration or similar measures and washed with a small amount of water. Instead of water, the washing can also be effected with titaniferous acid-poor washing liquid. The filtrate remaining after the separation of the iron sulfate is heated again—possibly together with the washing liquid—to 50 to 80° C. and used for dissolving further salt mixture. In this way, the titanium sulfate content of the solution increases. From the enriched solution, further iron sulfate heptahydrate is crystallized out by renewed cooling and removed; the filtrate is again used in the circuit for the dissolving of salt mixture and in this way further enriched in titanium sulfate, etc. The limit of the possible enrichment is obtained when the sulfuric acid concentration which simultaneously increases reaches a substantially upper limit of about 500 grams per liter. As soon as there is present in the filtrate remaining after the separation of iron sulfate heptahydrate an $Fe:TiO_2$ ratio of 0.25:1 to at most 1:1 and a titanium sulfate concentration of 50 to 200 grams per liter, and preferably 100 to 160 grams per liter $TiO_2$, a part of the filtrate is removed and hydrolyzed for the recovery of titanium dioxide, while the balance of the filtrate is recycled and used for further dissolving of salt mixture. The removing of the titanium sulfate solution from such a cyclic process can be effected both continuously and intermittently. The establishing of the optimum enrichment of titanium in the circuit can be obtained by addition of dilute titanium sulfate solutions, acid-free washing solutions or the like. By the cyclic process claimed, it is possible to produce a titanium sulfate solution of for instance 180 grams per liter $TiO_2$ and 360 grams per liter $H_2SO_4$ (ratio $H_2SO_4:TiO_2=2:1$) or 100 grams per liter $TiO_2$ and 400 grams per liter $H_2SO_4$ (ratio $H_2SO_4:TiO_2=4:1$). Such a titanium sulfate solution can be hydrolyzed by the methods customary in the production of titanium dioxide.

EXAMPLE 1

4.8 tons of a hydrolysis mother liquor having a sulfuric acid content of 18.3% $H_2SO_4$ are concentrated by evaporation to 65% $H_2SO_4$.

The salt mixture obtained in this connection, after cooling the concentrated acid solution to 50° C., is removed by centrifuging and washed with 10% by weight of a 10% sulfuric acid solution. In this way, one ton of salt mixture of composition A (see Table 1) is obtained. The salt mixture is dissolved at 60° C. with agitation in a mixture of 0.67 ton of water and 4.5 tons of filtrate of the composition B, which comes from the circuit. The solution obtained in this manner (composition C) is cooled to 20° C. The iron sulfate heptahydrate crystals which precipitate out are removed by a centrifuge and washed with a small amount of water. There are obtained 1.21 tons of salt (composition D) and 4.96 tons of filtrate (composition E).

4.5 tons of the filtrate are recycled for dissolving further amounts of salt mixture.

The balance of the filtrate (0.46 ton) is hydrolyzed; in this case, there is obtained a yield of 96.3% of a hydrated titanium oxide which is of a purity suitable for the production of pigment.

EXAMPLE 2

6.3 tons of an iron-poor hydrolysis mother liquor are treated in the manner described in Example 1. There is obtained thereby 1 ton of salt mixture of composition F (see Table 2). It is dissolved at 60° C. with agitation in 2 tons of filtrate of composition G which comes from the circuit. The solution obtained in this manner (composition H) is treated further as in Example 1. In this connection, 0.8 ton of filtrate (compoistion K) are obtained.

1.65 tons of the filtrate are brought together with the wash water to the composition G and returned to the circuit for dissolving further amounts of salt mixture. The balance of the filtrate (0.55 ton) is hydrolyzed with the precipitation of hydrated titanium oxide. 57 kg. of titanium oxide are obtained in a form suitable for the manufacture of pigment.

Table 1

| Analyses | A | B | C | D | E |
|---|---|---|---|---|---|
| Percent $H_2SO_4$ | 9.2 | 21.0 | 16.6 | 0.3 | 21.0 |
| Percent $TiO_2$ | 3.6 | 7.4 | 5.8 | 0.15 | 7.4 |
| Percent Fe | 22.9 | 3.3 | 6.6 | 17.7 | 3.3 |
| Percent Mg | 1.6 | 0.5 | 0.8 | 1.1 | 0.5 |

Table 2

| Analyses | F | G | H | I | K |
|---|---|---|---|---|---|
| Percent $H_2SO_4$ | 11.9 | 16.9 | 14.9 | 0.5 | 20.1 |
| Percent $TiO_2$ | 6.5 | 8.7 | 8.0 | 0.25 | 10.8 |
| Percent Fe | 14.7 | 3.3 | 7.1 | 17.0 | 3.5 |
| Percent Mg | 1.7 | 0.9 | 1.2 | 1.8 | 0.95 |

I claim:
1. In the treatment of mother liquor produced during the production of titanium dioxide by digestion of titaniferous ore in sulfuric acid wherein it is desired to separate and recover the sulfate values and titanium dioxide from said mother liquor, the improvement which comprises:
   (1) evaporating the said mother liquor to form a concentrated liquor containing from about 60–65% sulfuric acid,
   (2) cooling said concentrated liquor to form and precipitate a salt mixture of low acid content,
   (3) separating said salt mixture from said cooled concentrated liquor,
   (4) dissolving said salt mixture in a hot dilute solution of titanium sulfate to form a first salt solution,
   (5) cooling said first solution to form and precipitate the iron values as iron sulfate heptahydrate,
   (6) separating the heptahydrate from said first salt solution,
   (7) heating the residual filtrate of said first salt solution and adding it to additional salt mixture to dissolve the latter and form a second salt solution having an increased amount of titanium values over the amount contained in said first salt solution,
   (8) cooling said second salt solution to form and precipitate iron values as iron sulfate heptahydrate,
   (9) separating the heptahydrate from said cooled second salt solution,
   (10) hydrolysing at least part of the residual filtrate of said second salt solution to form and precipitate titanium dioxide.
2. Process according to claim 1 wherein the cyclical steps of dissolving additional salt mixture in the residual filtrate of the preceding salt solution to recover the iron values as iron sulfate heptahydrate and to increase the titanium values in the residual filtrate are repeated to produce a final residual filtrate having a $H_2SO_4:TiO_2$ ratio in the range of from 2:1 to 4:1; and from 100 to 160 g.p.l. $TiO_2$, hydrolyzing the final residual filtrate to form and precipitate $TiO_2$.
3. Process according to claim 1 wherein said mother liquor is concentrated by evaporation and then cooled to about 50° C. to form and precipitate a salt mixture having a $H_2SO_4:TiO_2$ ratio less than 4:1.

4. Process according to claim 3 wherein the dilute solution of titanium sulfate used to dissolve said salt mixture has a $H_2SO_4:TiO_2$ ratio in the range of from 1.6:1 to 2:1 and is heated to from 50 to 70° C.

5. Process according to claim 4 wherein the first salt solution formed by dissolving the salt mixture in dilute titanium sulfate solution is cooled to at least 20° C. to form and precipitate the iron values as iron sulfate heptahydrate.

References Cited in the file of this patent

UNITED STATES PATENTS

| | | |
|---|---|---|
| 2,098,056 | McBerty | Nov. 2, 1937 |
| 2,774,650 | Oppegaard | Dec. 18, 1956 |
| 2,849,289 | Zirngibl et al. | Aug. 26, 1958 |
| 2,928,725 | Hughes | Mar. 15, 1960 |
| 3,018,166 | Powell | Jan. 23, 1962 |
| 3,071,439 | Solomka | Jan. 1, 1963 |
| 3,091,515 | Dantoo | May 28, 1963 |